C. L. JOHNSON.
GEAR SHIFT LEVER LOCK.
APPLICATION FILED JAN. 27, 1919.
1,369,925.
Patented Mar. 1, 1921
2 SHEETS—SHEET 2.
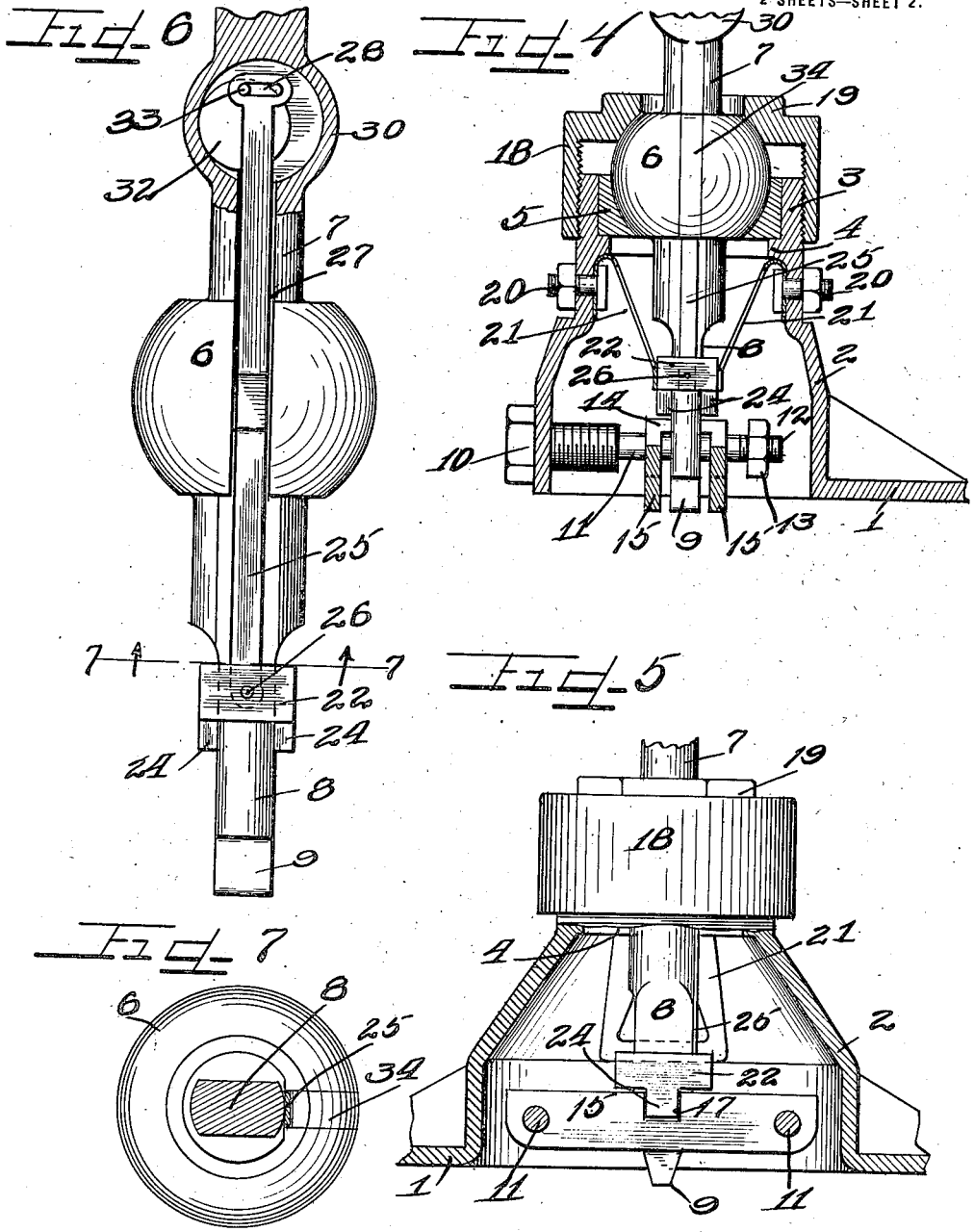

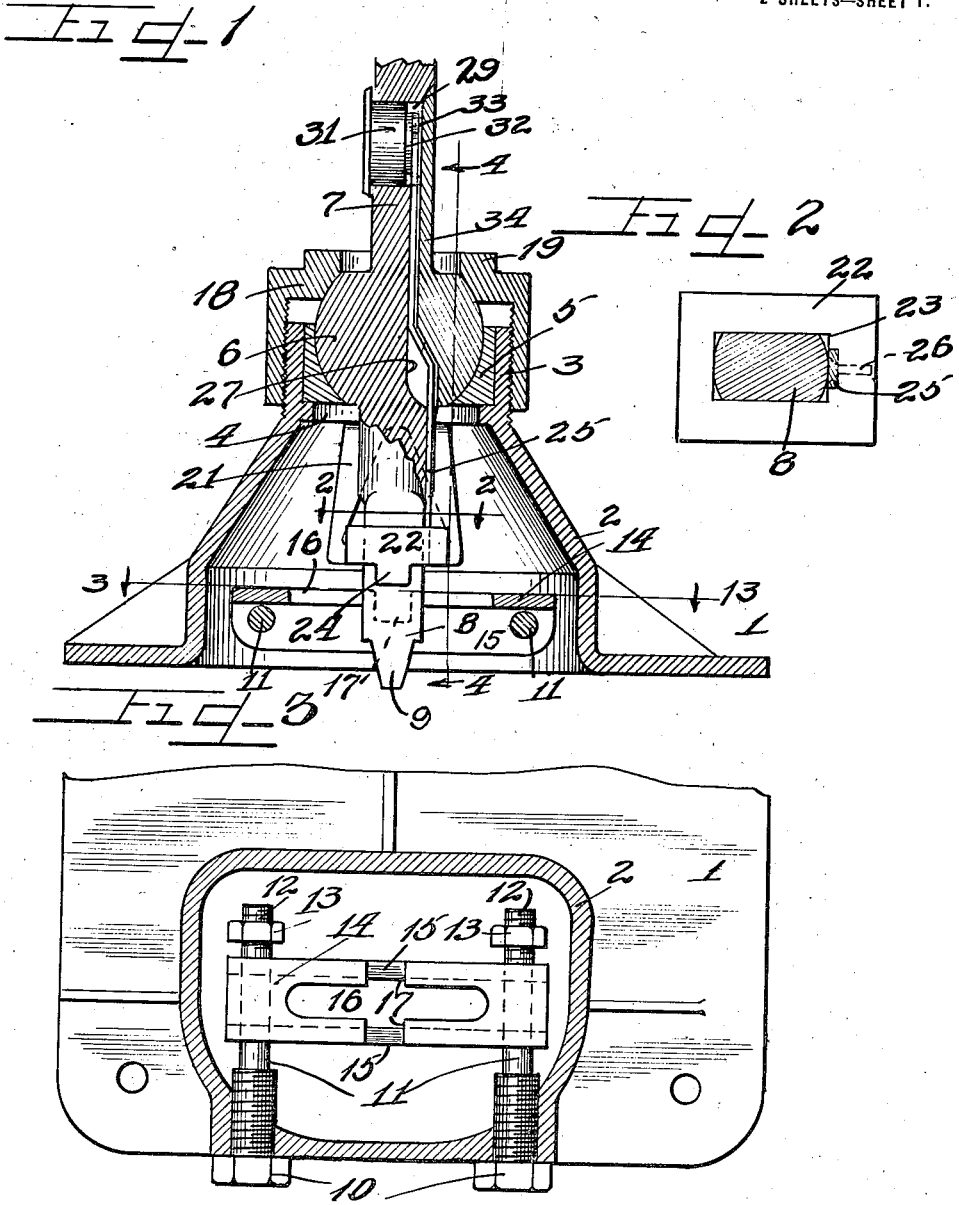

UNITED STATES PATENT OFFICE.

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

GEAR-SHIFT-LEVER LOCK.

1,369,925.   Specification of Letters Patent.   Patented Mar. 1, 1921.

Application filed January 27, 1919. Serial No. 273,380.

*To all whom it may concern:*

Be it known that I, COLVIN L. JOHNSON, a citizen of the United States, and a resident of the city of Chicago, in the county of Cook and state of Illinois have invented certain new and useful Improvements in Gear-Shift-Lever Locks; and I do hereby declare that the following is a full, clear, and exact description of the same, reference being had to the accompanying drawings, and to the numerals of reference marked thereon, which form a part of this specification.

This invention relates more particularly to a gear shift lever locking mechanism wherein a locking block slidably mounted upon the lower end of the lever is adapted to be actuated by a key-operated mechanism to cause projections on said block to be moved into recesses provided in a shiftable control member forming a part of the gear shift mechanism of a motor vehicle.

It is an object of this invention to provide an automobile gear shift lever lock wherein a slidable block is provided with projections adapted to be moved to seat in recesses formed in an adjustable lever guide block which controls the movement of the lever.

Another object of this invention is the construction of a gear shift lever lock having a locking block engaged thereon adapted to be moved into locking engagement with a slotted slidable member which controls the movement of the lever and forms a part of the gear shift mechanism, said locking block when engaged in said slidable member serving to hold said lever locked against longitudinal movement with respect to said slidable member.

It is an important object of the invention to provide a gear shift lever lock of simple and effective construction adapted to lock a gear shift lever against longitudinal shifting but permittting transverse shifting thereof.

Other and further objects of this invention will be apparent from the disclosures in the specification and drawings.

The invention (in a preferred form) is illustrated in the drawings and hereinafter more fully described.

On the drawings:—

Figure 1 is a central vertical section through a gear shift lever and its housing, showing a locking mechanism embodying the principles of this invention in elevation and in release position.

Fig. 2 is a detail section taken on line 2—2 of Fig. 1, with parts omitted.

Fig. 3 is a sectional plan view taken on line 3—3, of Fig. 1.

Fig. 4 is a vertical section taken on line 4—4, of Fig. 1, showing parts in elevation.

Fig. 5 is a fragmentary sectional view of the device showing the parts in locking position.

Fig. 6 is a detail elevation of the lower portion of the gear shift lever and the locking mechanism, with parts shown in section and parts omitted to disclose the construction.

Fig. 7 is a detail section taken on line 7—7, of Fig. 6.

As shown on the drawings:—

The reference numeral 1, indicates the cover plate of an automobile gear shift casing, and integrally formed on said cover plate is an upright fulcrum housing, casing or support 2, on the upper end of which an externally threaded neck 3, is integrally formed. A flange ring 4, is integrally formed within the housing 1, where said housing joins the neck, 3. Seated upon the flange 4, is a socket member 5, for movably receiving the ball 6, of a gear shift lever 7, the tail or lower end 8, of which is formed to afford flat sides. The lower end of the lever tail piece 8, is tapered to provide a tip 9, adapted to co-act with the gear shifting mechanisms of the automobile.

Adjustably threaded through the lower portion of one of the side walls of the housing 3, is a pair of parallel screw bolts 10, the inner portions 11, of which are reduced in diameter and smooth with the end portions threaded as denoted by the reference numeral 12. Stop nuts 13, are removably threaded on the bolt ends 12, for limiting the sliding movement of a gear shift controlling block or member, embracing a top plate 14, and integral side walls or plates 15. A long slot 16, is provided longitudinally in the top plate 14, of the controlling member to permit the tail piece 8, of the gear shift lever to project downwardly through the controlling member. A recess or switch 17, is cut in each of the controlling member side walls 15, and opens through the top plate 14, to communicate with the longitudinal slot 16, as clearly shown in Fig. 3.

An internally threaded cap 18, is removably threaded on the housing neck 3, for adjustably holding the gear shift lever in operating position. The cap 18, has an integral centrally apertured top nut 19, formed thereon through which the gear shift lever 7, projects. Held in position, by bolts 20, within the housing 2, are two oppositely disposed centralizing springs or resilient members 21, the lower or free ends of which contact opposite sides of a locking block or member 22, having an opening 23, therein to permit the locking block to be slidably engaged on the gear shift lever tail 8. Integrally formed centrally on the lower edge of each of the two sides of the locking block, is a locking lug or projection 24, adapted when the locking block is moved into locking position to seat within one of the recesses 17, to prevent movement of the gear shift lever in the slot 16.

Seated in a recess formed in the locking block 22, is the lower end of the latch or locking bar 25, which is secured to said locking block by means of a screw 26, or other suitable means. Formed longitudinally in the gear shift lever 7, is a long passage 27, for receiving the latch bar, the upper end of which is provided with a transverse slot 28. Mounted in a chamber 29, formed in an enlarged portion 30, of the gear shift lever 7, is a pin lock 31, having a rotatable barrel 32, on which a pin 33, is secured to project through the slot 28, in the upper end of the gear shift lever.

As clearly shown in Fig. 1, the passage 27, which opens through one side of the lever 7, is closed by means of a suitably shaped retaining bar 34, which is disposed in the outer part of the passage 27, and is secured to the lever by any suitable means to inclose the latch bar 25, which is bent to permit the lower portion thereof to project out of the lever to permit the lower end of said latch bar to be secured to the locking block 22, as already described.

The operation is a follows:—

Fig. 1, shows the neutral position of the gear shift lever, with the locking member in elevated normal position to permit the gear shift lever to be shifted backward or forward in the slot 16, or sidewise to slidably move the control block 14—15, on the guide bolts 10. A composite movement of the gear shift lever is thus permitted, so that the gears of an automobile or any other motor driven vehicle may be selectively operated.

In unlocked position of the lever 7, the pin 33, on the lock barrel 32, is in its uppermost position at one end of the slot 28, formed in the upper end of the latch bar 25, to hold the latch bar and the locking block 22—24, in release position. To lock the lever 7, from movement longitudinally in the slot 16, of the control block 14—15, the lever is first shifted to neutral position, and a key is inserted into the pin lock 31, to rotate the barrel 32, thereby sliding the lock pin 33, in the slot 28, thus forcing the latch bar 25, downwardly and moving the locking block 22, on the lever tail 8, into locking position wherein the lugs 24, seat in the recesses 17, of the control block 14—15, to hold the lever locked against longitudinal movement with respect to the control block, and thereby preventing theft of a vehicle, equipped with such a lock. To unlock the device, it is only necessary to insert the key in the lock 31, and turn the barrel 32, in an opposite direction to cause lifting of the latch bar 25, and the locking block attached thereto.

I am aware that various details of construction may be varied through a wide range without departing from the principles of this invention, and I therefore do not purpose limiting the patent granted otherwise than necessitated by the prior art.

I claim as my invention:—

1. In a gear shift lever lock of the class described the combination with a gear shift lever, of locking means therein, a locking block engaged around the lever and actuatable by the locking means, lugs integrally formed on the locking block, and an adjustable recessed control block for the lever adapted to receive said lugs seated in the recesses thereof to hold the lever locked.

2. In a device of the class described the combination with a gear shift lever, of locking means therein, a locking block slidable on said lever below the point of pivotal connection thereof and connected to said locking means, projections integrally formed on said locking block, resilient centralizing means for said locking block and a slotted lever control block forming a part of the gear shift mechanism of a vehicle and having recesses formed therein adapted to receive said projections to hold the lever locked.

3. In a device of the class described the combination with a gear shift lever of a locking block slidable thereon below the point of pivotal connection thereof, lugs integrally formed on the sides thereof, an adjustable slotted control block through which said lever projects, said control block having recesses formed therein, and key-operated means within the gear shift lever connected with said locking block to move the same downwardly into a position wherein said lugs engage in the recesses in the control block to hold the lever locked against movement in said slotted control block.

4. In a device of the class described the combination with a block forming a part of the gear shift mechanism of an automobile, said block having recesses and a longitudinal slot therein, means for adjustably supporting said block, a gear shift lever projecting downwardly through the slot in said block, a locking member slidably mounted on said lever, projections integrally formed thereon, and key-operated means within said lever connected with said locking members to move the same downwardly into a locking position wherein the projections formed thereon will seat in the recesses of said block to hold the lever locked.

5. The combination with a gear shift lever, of transversely slidable means controlling the movement thereof, and locking means on said lever adapted to be moved into position to engage said controlling means to hold the lever locked against longitudinal movement with respect to said controlling means.

6. The combination with a gear shift lever, of adjustable supporting members mounted on opposite sides of the lower end of said lever, slotted means shiftably engaged on said members with the lower end of said lever projecting therethrough, a locking member on said lever, and means formed thereon adapted to be moved into engagement with said slotted means to hold the lever locked against forward and backward movement with respect to said slotted means.

7. The combination with a slidable control block forming a part of the gear shift mechanism of an automobile and having recesses and a slot formed therein, means for adjustably supporting said control block, a gear shift lever projecting through the slot in the control block, locking means in said lever, a locking member slidable on said lever and connected with said locking means, and lugs integrally formed on said locking member, said locking means adapted to move the locking member into a locking position wherein said lugs engage in the recesses of the control block to hold the lever locked against movement in the control block slot.

In testimony whereof I have hereunto subscribed my name in the presence of two subscribing witnesses.

COLVIN L. JOHNSON.

Witnesses:
CHARLES W. HILLS, Jr.,
E. McMULLEN.